United States Patent
Zhang (10) Patent No.: US 12,117,806 B1
(45) Date of Patent: Oct. 15, 2024

(54) CLOUD AND EDGE INTEGRATED METHOD AND SYSTEM FOR IDENTIFYING PARAMETERS OF SERVO MOTOR

(71) Applicant: Guangdong Polytechnic Normal University, Guangzhou (CN)

(72) Inventor: Bitao Zhang, Guangzhou (CN)

(73) Assignee: Guangdong Polytechnic Normal University, Guangzhou (CN)

( * ) Notice: Subject to any disclaimer, the term of this patent is extended or adjusted under 35 U.S.C. 154(b) by 0 days.

(21) Appl. No.: 18/660,277

(22) Filed: May 10, 2024

(30) Foreign Application Priority Data

Sep. 5, 2023 (CN) .......................... 202311134465.1

(51) Int. Cl.
*G05B 19/4155* (2006.01)

(52) U.S. Cl.
CPC ............... *G05B 19/4155* (2013.01); *G05B 2219/34013* (2013.01)

(58) Field of Classification Search
None
See application file for complete search history.

(56) References Cited

U.S. PATENT DOCUMENTS

| | | | | |
|---|---|---|---|---|
| 11,682,993 | B1* | 6/2023 | Mušák et al. | H02P 21/10 |
| | | | | 318/400.02 |
| 2008/0180046 | A1* | 7/2008 | D'Angelo | H02P 6/182 |
| | | | | 318/400.06 |
| 2017/0104432 | A1* | 4/2017 | Jebai | H02P 23/0077 |
| 2021/0021221 | A1 | 1/2021 | Glibbery et al. | |

FOREIGN PATENT DOCUMENTS

| | | |
|---|---|---|
| CN | 106655941 A | 5/2017 |
| CN | 111342728 A | 6/2020 |
| CN | 114915225 A | 8/2022 |

* cited by examiner

*Primary Examiner* — Ryan A Jarrett
(74) *Attorney, Agent, or Firm* — Nitin Kaushik (57) ABSTRACT

The present invention discloses a cloud and edge integrated method and system for identifying parameters of a servo motor. The method comprises the following steps: acquiring parameters of the servo motor; transmitting the parameters of the servo motor to a cloud identification engine and an edge identification engine; performing data processing and identification analysis, by the cloud identification engine, the parameters of the servo motor to obtain an internal resistance of the motor Rs, and sending an identification result to the edge identification engine through a network; identifying, by the edge identification engine, the cloud identification result and the parameters of the servo motor to obtain identification results of d-q axes inductances and a flux linkage. The system comprises a servo motor parameter acquisition unit, a sending unit, a cloud identification engine, and an edge identification engine.

6 Claims, 5 Drawing Sheets

CLOUD AND EDGE INTEGRATED METHOD AND SYSTEM FOR IDENTIFYING PARAMETERS OF SERVO MOTOR

CROSS-REFERENCE TO RELATED APPLICATIONS

The application claims priority to Chinese patent application No. 202311134465.1, filed on Sep. 5, 2023, the entire contents of which are incorporated herein by reference.

TECHNICAL FIELD

The present application relates to control of electric appliances, and in particular to a cloud and edge integrated method and system for identifying parameters of a servo motor.

BACKGROUND

Permanent magnet synchronous motors can realize accurate rotating speed control and good torque response through vector control, but the vector control is sensitive to the change of motor parameters. During actual operation of the motor, the motor parameters such as resistance, inductance and flux linkage of the motor often change in real time due to the influence of factors such as temperature change and external interference. Changes in these parameters would affect the performance of the motor control system and, in turn, the operating state of the motor.

The parameter identification of the permanent magnet synchronous motor is a very complicated process, and the parameters typically needing to be identified are stator resistance R, d-q axes inductances $L_d$ and $L_q$, permanent magnet flux linkage $\varphi_f$ etc. The operation of the motor system is influenced by a plurality of external objective factors, and the parameters of the motor change along with the operation of the motor. The most important external factor is the problem of temperature rise during the operation of the motor, leading to an increase in stator resistance. Meanwhile, the permanent magnet flux linkage is also influenced by the temperature rise, indirectly causing changes in inductance. To maintain the control performance of the motor, the motor parameters need to be identified in real time and the control strategy needs to be adjusted according to the change of the motor parameters.

The motor parameter identification academically is mainly divided into an off-line type and an on-line type. Off-line identification is mainly to obtain electrical parameters of the motor through experimental measurements, for example, the resistance of the motor can be obtained directly by direct current voltage using the principle that voltage is equal to the product of current and resistance; and the measurement of inductance requires applying high-frequency voltage to the stator to obtain inductance parameters through response values of current to signals. Compared with the off-line identification method, on-line identification focuses on parameter changes in the motor operation process, and has good dynamic significance. Only by identifying the motor parameters in the operation process can the obtained data better feed back the real condition of the motor to the controller, so that the motor can be controlled more accurately. At present, the main methods for identifying motor parameters on line comprise a least square method, an extended Kalman filter, model reference self-adaptation, an intelligent algorithm, etc.

The existing motor parameter identification algorithm is low in accuracy or real-time performance, which in turn affects the control performance of a motor.

SUMMARY

Based on the above description, it is necessary to provide a cloud and edge integrated method for identifying parameters of a servo motor to address the aforementioned technical issues.

A cloud and edge integrated method for identifying parameters of a servo motor, comprising the following steps:
  acquiring parameters of the servo motor;
  transmitting the parameters of the servo motor to a cloud identification engine and an edge identification engine;
  performing processing and identification analysis, by the cloud identification engine, the parameters of the servo motor to obtain an internal resistance of the motor $R_s$, and sending an identification result to the edge identification engine through a network;
  identifying, by the edge identification engine, the cloud identification result and the parameters of the servo motor to obtain identification results of d-q axes inductances and a flux linkage.

The parameters of the servo motor include d-q axes feedback currents $i_d$ and $i_q$, d-q axes input voltages $u_d$ and $u_q$, an angular velocity of the motor ω, d-q axes inductances of the motor $L_q$ and $L_d$, an internal resistance of the motor R, a flux linkage $\varphi_f$, etc. With respect to the parameters, $i_d$, $i_q$, $u_d$, $u_q$ and ω may be calculated by real-time measuring with sensors, while $L_q$, $L_q$, $R_s$ and $\varphi_f$ are parameters that need to be identified. According to equation (1), it can be seen that there is a problem of rank deficiency by using two equations. The present invention is based on cloud computing power to identify $R_s$, which is complex and changeable, in the cloud, simplifying the identification of inductance and flux linkage.

$$\begin{bmatrix} \frac{dI_d}{dt} \\ \frac{dI_q}{dt} \end{bmatrix} = \begin{bmatrix} L_d^{-1} & 0 \\ 0 & L_q^{-1} \end{bmatrix} \begin{bmatrix} -R_s & \omega L_q \\ -\omega L_d & -R_s \end{bmatrix} \begin{bmatrix} i_d \\ i_q \end{bmatrix} + \begin{bmatrix} L_d^{-1} & 0 \\ 0 & L_q^{-1} \end{bmatrix} \begin{bmatrix} u_d \\ u_q \end{bmatrix} + \begin{bmatrix} L_d^{-1} & 0 \\ 0 & L_q^{-1} \end{bmatrix} \begin{bmatrix} 0 \\ \omega \varphi_f \end{bmatrix} \quad (1)$$

In one embodiment, a neural network identification algorithm in the cloud identification engine is as follows:

$$R_s = f_k(\cdot)*G2 + f_{k-1}(\cdot)*G1$$

where G1 and G2 are weights of corresponding output functions, and G1+G2=1.
$f_k(\cdot)$ represents a network output value at a time k, $f_{k-1}(\cdot)$ represents a network output value at a time k−1, defined as follows:

$$f_k(\cdot) = i_q*w1 + i_d*w2 + u_q*w3 + u_d*w4 + T*w5 + w*w6$$

where wi represents a weight of an input quantity, i=1, 2, ..., 6, and w1+w2+w3+w4+w5+w6=1, w is a motor speed, $i_d$ and $i_q$ are d-q axes currents, $u_d$ and $u_q$ are d-q axes input voltages, and T is a motor temperature.

Since the acquired parameter data contains a lot of noises, the acquired parameter data is uploaded to the cloud identification engine for data processing, the data is cleaned to remove the noises, and thus an accurate identification result can be obtained. The motor temperature changes slowly, and the temperature fluctuation is small after the motor runs stably; the current of the motor is greatly affected by temperature and voltage, changes frequently and complexly with more noises, and thus the present invention mainly performs data processing on temperature and current of the motor.

For the motor temperature T, it is preferred to use a low-pass filter for processing, as follows:

$$H(s) = \frac{1}{\frac{s}{w_c}+1}, w_c = 2\pi * f_c$$

where H(s) is a Laplace transform transfer function, s is a complex frequency domain, $w$ is a cutoff frequency, and $f_c$ is a frequency.

Filtering is performed by using the following equations (2)-(6) for data processing of the currents of the motor $i_{q/d}$:

a q/d-axis decoupling model of the motor is established:

$$\begin{cases} i_{q/d}(t+1) = Ci_{q/d}(t) + Du_{q/d}(t) + d(t) \\ z(t) = Hi_{q/d}(t) + v(t) \end{cases}$$

where $C=-R_s/L_{q/d}$, $D=1/L_{q/d}$, d(t) is a process noise, v(t) is a measurement noise, z(t) is a state observed quantity, H is a state transfer coefficient, $R_s$ is the internal resistance of the motor, and $L_{q/d}$ is the q/d-axis inductance;

$$\tilde{i}_{q/d}(t+1)=C\tilde{i}_{q/d}(t)+Du_{q/d}(t) \quad (2)$$

where $\tilde{i}_{q/d}(t+1)$ is a predicted value of the q/d-axis current, $\tilde{i}_{q/d}(t)$ is an optimal estimated value of the current, and $u_{q/d}(t)$ is an input value of the q/d-axis voltage;

in addition, let $$\tilde{i}_{q/d}(t+1)=\vec{i}_{q/d}(t+1)+K_k(z(t)-H\vec{i}_{q/d}(t+1)) \quad (3)$$

where $K_k$ is a gain coefficient, defined as follows:

$$K_k=\vec{P}_k H^T(H\vec{P}_k H^T+R)^{-1} \quad (4)$$

where $H^T$ is a matrix transpose of H, and R is a covariance of the measurement noise v(t);

$\vec{P}_k$ is a covariance between the real value and the predicted value, defined as P follows:

$$\vec{P}_k = E[\vec{e}_k * \vec{e}_k^T] = \frac{1}{n-1}\sum_{i=1}^n \vec{e}_{ki} * \vec{e}_{ki}^T,$$

where $\vec{e}_k$ is a prior state error, defined as: $\vec{e}_k = i_{q/d}(t) - \vec{i}_{q/d}(t)$; $\vec{e}_{ki}$ represents an i-th prior state error sample;

moreover, a covariance $P_k$ between the real value and the optimal estimated value is defined:

$$P_k = E[e_k * e_k^T] = \frac{1}{n-1}\sum_{i=1}^n e_{ki} * e_{ki}^T,$$

where $e_k$ is a posterior state error, defined as: $e_k = i_{q/d}(t) - \tilde{i}_{q/d}(t)$; and $e_{ki}$ represents an i-th posterior state error sample;

moreover, a covariance $P_k$ between the real value and the optimal estimated value is defined:

and update laws are as follows:

$$P_k = (I-K_k H)\vec{P}_k \quad (5)$$

$$\vec{P}_{k+1} = CP_k C^T + Q \quad (6)$$

where I is an identity matrix, and Q is a covariance of the process noise d(t).

Another object of the present invention is to provide a cloud and edge integrated system for identifying parameters of a servo motor, comprising:

a servo motor parameter acquisition unit used for acquiring parameter data of the servo motor;

a sending unit used for receiving the parameter data of the servo motor and sending it to a cloud identification engine and an edge identification engine so as to enable the cloud identification engine and the edge identification engine to identify the parameters of the servo motor respectively;

the cloud identification engine used for identifying the parameter data of the servo motor and sending an identification result to the edge identification engine;

the edge terminal identification engine used for performing identification analysis of the acquired parameter data of the servo motor and the cloud identification result to obtain target parameter results;

In the present invention, the cloud identification engine comprises a data processing module, a neural network identification module and an output module; where the data processing module is used for processing and denoising the acquired parameter data of the servo motor;

the neural network identification module is used for identifying the acquired parameter data of the servo motor to obtain $R_s$;

the output module is used for transmitting the identification result to the edge identification engine.

In one embodiment of the invention, the data processing module processes the motor temperature T according to the following low-pass filter:

$$H(s) = \frac{1}{\frac{s}{w_c}+1}, w_c = 2\pi * f_c$$

where H(s) is a Laplace transform transfer function, s is a complex frequency domain, $w_c$ is a cutoff frequency, and $f_c$ is a frequency.

The data processing module denoises the current of the motor according to equations (2)-(6) above.

The neural network identification module identifies the internal resistance of the motor Rs based on the following neural network identification algorithm:

$$R_s=f_k(\cdot)*G2+f_{k-1}(\cdot)*G1$$

where G1 and G2 are weights of corresponding output functions, and G1+G2=1.

$f_k(\cdot)$ represents a network output value at a time k, $f_{k-1}(\cdot)$ represents a network output value at a time k−1, defined as follows:

$$f_k(\cdot)=i_q*w1+i_d*w2+u_q*w3+u_d*w4+T*w5+w*w6$$

where wi represents a weight of an input quantity, i=1, 2, ..., 6, and w1+w2+w3+w4+w5+w6=1, w is a motor speed, $i_d$ and $i_q$ are d-q axes currents, $u_d$ and $u_q$ are d-q axes input voltages, and T is a motor temperature.

In one embodiment of the invention, the edge identification engine identifies the parameters Lq, Ld and $\varphi_f$ by using the following equations:

the parameters A and B may be identified according to the following two equations:

$$A = \frac{\sum_{i=1}^{n} y_i \left( x_i - \frac{1}{n} \sum_{i=1}^{n} x_i \right)}{\sum_{i=1}^{n} x_i^2 - \frac{1}{m} \left( \sum_{i=1}^{m} x_i \right)^2}$$

$$B = \frac{1}{m} \sum_{i=1}^{n} (y_i - A x_i)$$

where dimensions of $y_i$ and $x_i$ are m*n dimensions, $$y_i = \begin{pmatrix} i_d \\ i_q \end{pmatrix}, x_i = \begin{pmatrix} u_d \\ u_q \end{pmatrix}, A = \begin{bmatrix} R_s & -\omega L_q \\ \omega L_d & R_s \end{bmatrix}^{-1},$$

$$B = \begin{bmatrix} R_s & -\omega L_q \\ \omega L_d & R_s \end{bmatrix}^{-1} \begin{bmatrix} 0 \\ \omega \varphi_f \end{bmatrix},$$

$i_d$ and $i_q$ are the d-q axes currents, $u_d$ and $u_q$ are the d-q axes input voltages, T is the motor temperature, $R_s$ is the internal resistance of the motor, $\omega$ is an angular velocity of the motor, $L_d$ and $L_q$ are the d-q axes inductances, and $\varphi_f$ is the flux linkage.

According to the cloud and edge integrated method and system for identifying parameters of a servo motor provided by the invention, the complex and changeable parameter Rs is identified based on the computing power of the cloud, and then identification is performed by the edge identification engine in combination with the above identification result and other parameter data acquired in real time, so that the inductances and the flux linkage are obtained. The present invention ensures the accuracy of parameter identification while meeting the real-time requirement through the powerful computing power of the cloud and the real-time processing capability of the edge, providing a dynamic and accurate model for real-time precise control of the motor.

According to the invention, the parameter data of the servo motor is denoised before neural network identification, and noises are removed by filtering the data, so that the identification precision and accuracy are improved.

The mathematical model provided by the present invention for data processing of the motor temperature T and the current can improve the denoising effect and further improve the identification precision and accuracy.

The neural network identification model provided by the invention has a very high identification accuracy, for example, the identification result $R_s$ shown in table 1 of the embodiment is 2.874934831393645, and the real value measured is 2.875.

DETAILED DESCRIPTION OF THE EMBODIMENTS

To make objectives, technical solutions, and advantages of the present application more clearly, the following further describes the present application in detail with reference to the accompanying drawings and embodiments. It should be understood that the specific embodiments described herein are merely intended to explain the present application, but not to limit the present application.

Figure 1:
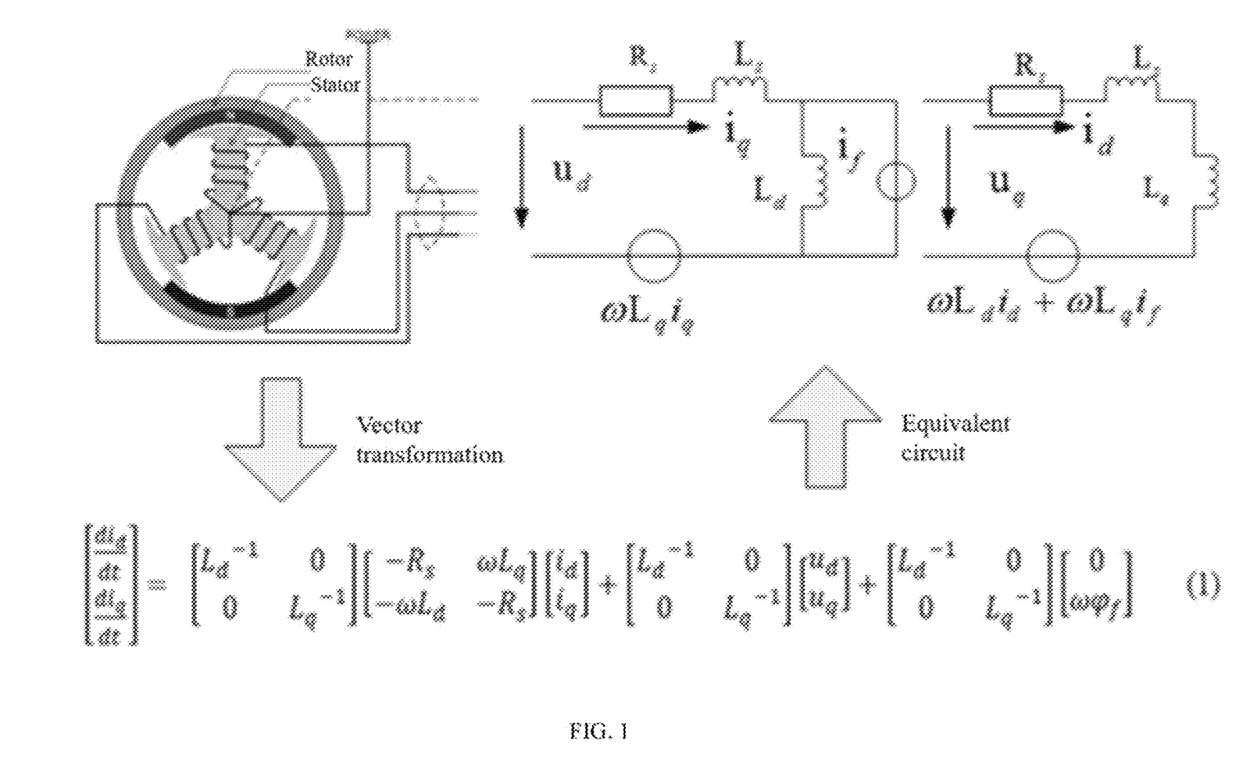
FIG. 1 shows a permanent magnet synchronous motor model and an equivalent circuit.

As shown in a permanent magnet synchronous motor model and an equivalent circuit in FIG. 1, a servo motor may be described by a mechanism equation of equation (1).

$$\begin{bmatrix} \frac{dI_d}{dt} \\ \frac{dI_q}{dt} \end{bmatrix} = \begin{bmatrix} L_d^{-1} & 0 \\ 0 & L_q^{-1} \end{bmatrix} \begin{bmatrix} -R_s & \omega L_q \\ -\omega L_d & -R_s \end{bmatrix} \quad (1)$$

$$\begin{bmatrix} i_d \\ i_q \end{bmatrix} + \begin{bmatrix} L_d^{-1} & 0 \\ 0 & L_q^{-1} \end{bmatrix} \begin{bmatrix} u_d \\ u_q \end{bmatrix} + \begin{bmatrix} L_d^{-1} & 0 \\ 0 & L_q^{-1} \end{bmatrix} \begin{bmatrix} 0 \\ \omega \varphi_f \end{bmatrix}$$

In equation (1), $i_d$ and $i_q$ are d-q axes feedback currents of the motor, which may be calculated by measuring with current sensors; $u_d$ and $u_q$ are d-q axes input voltages of the motor; $\omega$ is an angular velocity of the motor, which may be calculated by measuring with a sensor. $L_q$ and $L_d$ are d-q axes inductances of the motor, which are parameters needing to be identified, and the present invention focuses on identifying the motor with $L_q = L_d$; $R_s$ is an internal resistance of the motor, which is a parameter needing to be identified; and $\varphi_f$ is a flux linkage, which is a parameter needing to be identified.

According to the above analysis, $R_s$, $L_q/L_d$ and $\varphi_f$ are 3 parameters needing to be identified, but there are only two equations in equation (1), raising a problem of rank deficiency.

In order to solve the problem of rank deficiency, a parameter needs to be identified in a cloud. The cloud has strong computing power and can identify complex and changeable parameters. $R_s$ is greatly influenced by temperature and is related to current and voltage, so the cloud may be used for identifying it and then send an identification result to an edge, and the remaining two parameters may be identified with the two equations.

Figure 2:
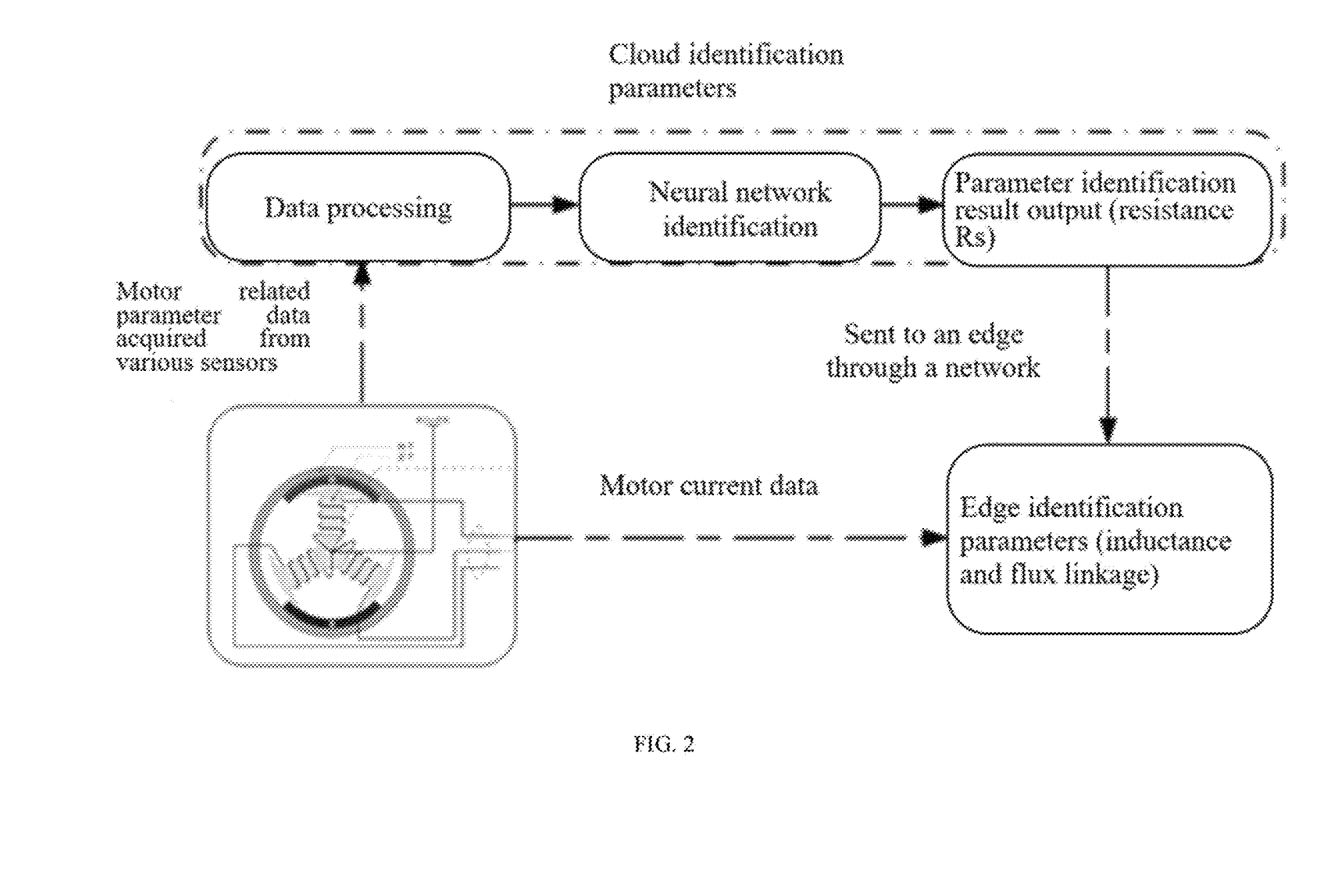
FIG. 2 is a schematic diagram of a system for identifying motor parameters according to the present invention.
Figure 3:
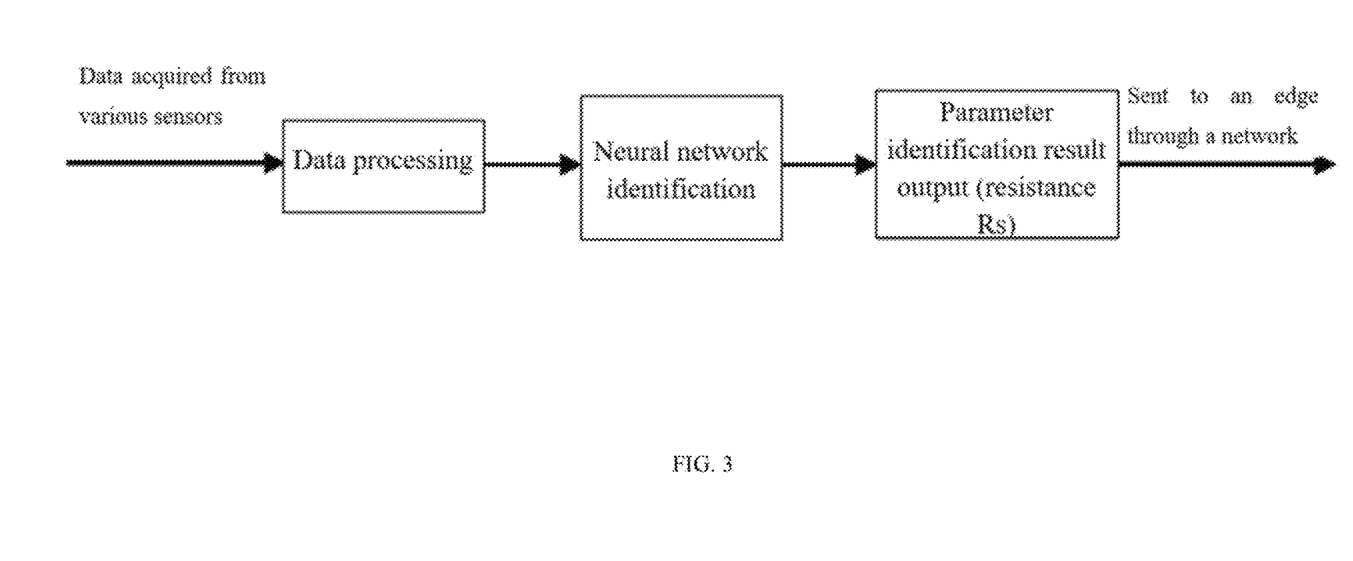
FIG. 3 is a flow chart of resistance $R_s$ cloud identification according to the present invention.

As shown in FIG. 2, parameter data acquired by sensors are transmitted to a cloud identification engine and an edge identification engine, respectively. The cloud identification engine performs parameter cloud identification and outputs an obtained identification result to the edge identification engine. The edge terminal identification engine is performs parameter identification by combining the acquired parameter data and the cloud identification parameter result.

Specifically, this embodiment comprises the following steps:

1. Acquiring motor related parameter data acquired by various sensors, including
   a motor temperature T, d-q axes feedback currents $i_d$ and $i_q$, d-q axes input voltages $u_d$ and $u_q$, and angular velocity of the motor $\omega$.
2. Sending acquired parameter data to the cloud identification engine and the edge identification engine, respectively.

3. Performing, by the cloud identification engine, parameter identification to obtain a parameter derived from an identification result, i.e. the internal resistance of the motor $R_s$, and sending the identification result to the edge identification engine.

3.1 Data Processing

Since the acquired parameter data contains a lot of noises such as current, the acquired parameter data is uploaded to the cloud identification engine for data processing, and the data is cleaned to remove the noises. The motor temperature changes slowly, and the temperature fluctuation is small after the motor runs stably; the current of the motor changes frequently and has more noises, so the data is denoised before neural network identification is performed. A digital filter can weaken or remove noises according to frequency characteristics of signals, which can effectively reduce digital noises. According to the temperature and current data characteristics of the motor, in this embodiment, the following methods are preferably employed for data processing respectively. The d-q axes input voltages $u_d$ and $u_q$ and the angular velocity of the motor w are theoretical values, and denoising is not needed.

a. Data processing of motor temperature T

A temperature signal is processed by using a low-pass filter as follows:

$$H(s) = \frac{1}{\frac{s}{w_c}+1}, \; w_c = 2\pi * f_c$$

where H(s) is a Laplace transform transfer function, s is a complex frequency
domain, $w_c$ is a cutoff frequency, and $f_c$ is a frequency.

b. Data processing of the currents of the motor $i_{q/d}$

Taking the q-axis current as an example, data processing is performed by using the following filtering method, which is also applicable to the d-axis current:

Firstly, a q-axis decoupling model of the motor is established:

$$\begin{cases} i_q(t+1) = Ci_q(t) + Du_q(t) + d(t) \\ z(t) = Hi_q(t) + v(t) \end{cases}$$

where $C=-R_s/L_q$, $D=1/L_q$, d(t) is a process noise, v(t) is a measurement noise, z(t) is a state observed quantity, H is a state transfer coefficient, $R_s$ is the internal resistance of the motor, and $L_q$ is the q-axis inductance. Then let $$\vec{I}_q(t+1)=C\vec{I}_q(t)+Du_q(t) \qquad (2)$$

where $\vec{I}_q(t+1)$ is a predicted value of the q-axis current, $\bar{I}_q(t)$ is an optimal estimated value of the current, and $u_g(t)$ is an input value of the q-axis voltage.

In addition, let $$\bar{I}_q(t+1)=\vec{I}_q(t+1)+K_k(z(t)-H\vec{I}_q(t+1)) \qquad (3)$$

where $K_k$ is a gain coefficient, defined as follows:

$$K_k=\vec{P}_k H^T(H\vec{P}_k H^T+R)^{-1} \qquad (4)$$

where $H^T$ is a matrix transpose of H, and R is a covariance of the measurement noise v(t).

$\vec{P}_k$ is a covariance between the real value and the predicted value, defined as follows:

$$\vec{P}_k = E[\vec{e}_k * \vec{e}_k^T] = \frac{1}{n-1}\sum_{i=1}^{n} \vec{e}_{ki} * \vec{e}_{ki}^T$$

where $\vec{e}_k$ is a prior state error, defined as: $\vec{e}_k = i_{q/d}(t) - \vec{i}_{q/d}(t)$;

$\vec{e}_{ki}$ represents an i-th prior state error sample.

Moreover, a covariance $P_k$ between the real value and the optimal estimated value is defined:

$$P_k = E[e_k * e_k^T] = \frac{1}{n-1}\sum_{i=1}^{n} e_{ki} * e_{ki}^T$$

where $e_k$ is a posterior state error, defined as: $e_k = i_q(t) - \bar{I}_q(t)$; and $e_{ki}$ represents an i-th posterior state error sample.

Moreover, a covariance $P_k$ between the real value and the optimal estimated value is defined, and update laws may be obtained as follows:

$$P_k = (I - K_k H)\vec{P}_k \qquad (5)$$

$$\vec{P}_{k+1} = CP_k C^T + Q \qquad (6)$$

where I is an identity matrix, and Q is a covariance of the process noise d(t).

By using the above mathematical equations, the current data of the motor may be denoised, which is beneficial for obtaining accurate results in neural network identification.

3.2 Neural Network Identification

Figure 4:
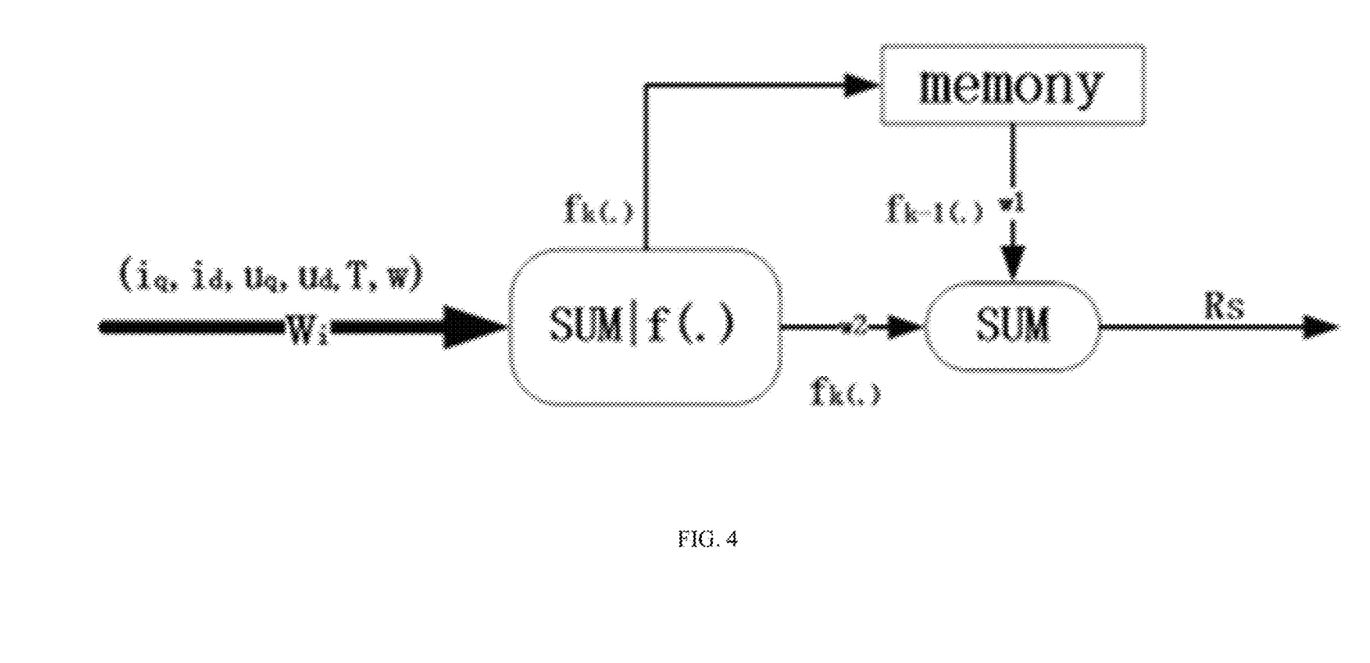
FIG. 4 is a block diagram of a resistance $R_s$ neural network identification algorithm according to the present invention.

After data processing is completed, neural network identification may be performed. The present embodiment preferably uses a neural network identification model shown in FIG. 4. The neural network identification model is as follows:

$$R_s = f_k(\cdot)*G2 + f_{k-1}(\cdot)*G1$$

where G1 and G2 are weights of corresponding output functions, and G1+G2=1.

$f_k(\cdot)$ represents a network output value at a time k, $f_{k-1}(\cdot)$ represents a network output value at a time k−1, defined as follows:

$$f_k(\cdot) = i_q*w1 + i_d*w2 + u_q*w3 + u_d*w4 + T*w5 + w*w6$$

where wi represents a weight of an input quantity, i=1, 2, ..., 6, and w1+w2+w3+w4+w5+w6=1, w is a motor speed, $i_d$ and $i_q$ are d-q axes currents, $u_d$ and $u_q$ are d-q axes input voltages, and T is a motor temperature.

An identification network structure of motor resistance may be established by using the above equations to achieve independent identification of the motor resistance.

4. Identification of parameters $L_q=L_d$ and $\varphi_f$ by the edge identification engine The identification result obtained by cloud identification, i.e. the internal resistance of the motor $R_s$, is sent to the edge identification engine through a network for identification. That is, the internal resistance of the motor $R_s$ is substituted into equation (1) for identification, so that the two equations only have two parameters of inductances and a flux linkage, and the following method may be used for identification:

according to equation (1), when the current is stable: $di_{q/d}/dt=0$, then equation (1) may be transformed into the following by simple operation:

$$y_i = Ax_i + B$$

where $$y_i = \begin{pmatrix} i_d \\ i_q \end{pmatrix}, x_i = \begin{pmatrix} u_d \\ u_q \end{pmatrix},$$

$$A = \begin{bmatrix} R_s & -\omega L_q \\ \omega L_d & R_s \end{bmatrix}^{-1},$$

$$B = \begin{bmatrix} R_s & -\omega L_q \\ \omega L_d & R_s \end{bmatrix}^{-1} \begin{bmatrix} 0 \\ \omega \varphi_f \end{bmatrix},$$

$i_d$ and $i_q$ are the d-q axes currents, $u_d$ and $u_q$ are the d-q axes input voltages, T is the motor temperature, $R_s$ is the internal resistance of the motor, ω is an angular velocity of the motor, $L_d$ and $L_q$ are the d-q axes inductances, and ω is the flux linkage.

The parameters A and B may be identified according to the following two equations:

$$A = \frac{\sum_{i=1}^{n} y_i \left( x_i - \frac{1}{n} \sum_{i=1}^{n} x_i \right)}{\sum_{i=1}^{n} x_i^2 - \frac{1}{m} \left( \sum_{i=1}^{m} x_i \right)^2},$$

$$B = \frac{1}{m} \sum_{i=1}^{n} (y_i - Ax_i),$$

where dimensions of $y_i$ and $x_i$ are m*n dimensions.

Since $R_s$ is identified by the cloud, and ω is the angular velocity of the motor and may be measured by a sensor, two parameters of the inductances $L_q$ and $L_d$ and the flux linkage $\varphi_f$ may be calculated according to the two equations.

Figure 5:
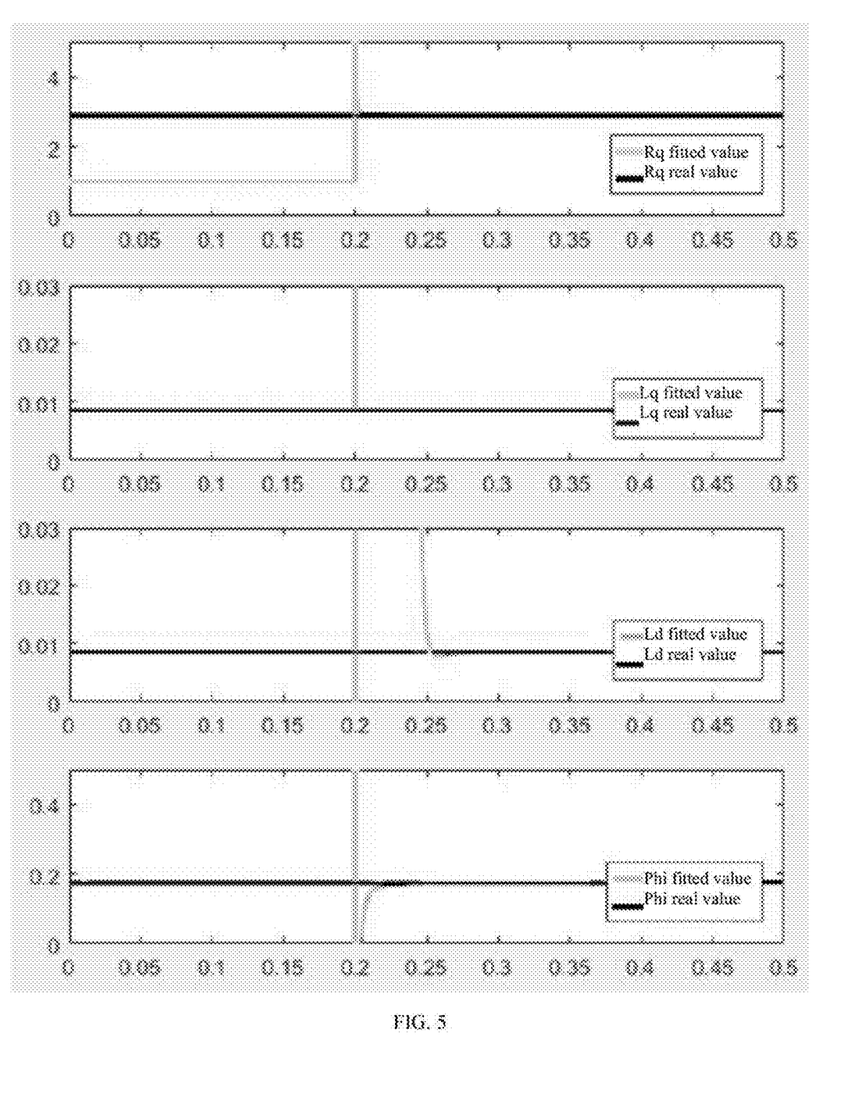
FIG. 5 is a diagram of recognition results according to the present invention.

FIG. 5 and table 1 show the identification results obtained by the method described in the present embodiment. The results in FIG. 5 and table 1 show that the identification results are very close to the real values, which indicates that the identification accuracy of the present invention is very high.

TABLE 1

Identification results

| Parameter | Real value | Identification value |
|---|---|---|
| $R_s$ | 2.875 | 2.874934831393645 |
| $L_q$ | 0.0085 | 0.008500000000003 |
| $L_d$ | 0.0085 | 0.008501320910719 |
| Phi($\varphi_f$) | 0.175 | 0.175000189803229 |

Correspondingly, an embodiment of the present invention also provides a cloud and edge integrated system for identifying parameters of a servo motor. As shown in FIG. 2, the system includes:

A servo motor parameter acquisition unit used for acquiring parameter data of a servo motor, such as a motor temperature T, d-q axes feedback currents $i_d$ and $i_q$, d-q axes input voltages $u_d$ and $u_q$, and an angular velocity of the motor ω. The acquisition unit is sensors disposed at different parts of the motor, such as a current sensor, a voltage sensor, a temperature sensor, etc.

A sending unit used for receiving the parameter data of the servo motor and sending it to a cloud identification engine and an edge identification engine so as to enable the cloud identification engine and the edge identification engine to identify the parameters of the servo motor respectively.

The cloud identification engine used for identifying the parameter data of the servo motor and sending an identification result to the edge identification engine.

The edge terminal identification engine used for performing identification analysis of the acquired parameter data of the servo motor and the cloud identification result to obtain target parameter results.

In the present invention, the cloud identification engine comprises a data processing module, a neural network identification module and an output module; where The data processing module is used for processing and denoising the acquired parameter data of the servo motor. The data processing module processes the motor temperature T according to the following low-pass filter:

$$H(s) = \frac{1}{\frac{s}{w_c} + 1}, w_c = 2\pi * f_c$$

where H(s) is a Laplace transform transfer function, s is a complex frequency domain, $w_c$ is a cutoff frequency, and $f_c$ is a frequency.

The data processing module denoises the current of the motor according to equations (2)-(6) above.

The neural network identification module is used for identifying the acquired parameter data of the servo motor to obtain $R_s$. The neural network identification module identifies the internal resistance of the motor $R_s$ based on the following neural network identification algorithm:

$$R_s = f_k(\cdot) * G2 + f_{k-1}(\cdot) * G1$$

where G1 and G2 are weights of corresponding output functions, and G1+G2=1.

$f_k(\cdot)$ represents a network output value, defined as follows:

$$f_k(\cdot) = i_q*w1 + i_d*w2 + u_q*w3 + u_d*w4 + T*w5 + w*w6$$

where wi represents a weight of an input quantity, i=1, 2, . . . , 6, and w1+w2+w3+w4+w5+w6=1; and w is a motor speed.

A memory is used for storing a value of a previous time.

The output module is used for transmitting the identification result to the edge identification engine through a network.

What is claimed is:

1. A cloud and edge integrated method for identifying parameters of a servo motor, comprising the following steps:
   acquiring parameters of the servo motor;
   transmitting the parameters of the servo motor to a cloud identification engine and an edge identification engine;
   performing data processing and identification analysis, by the cloud identification engine, the parameters of the servo motor to obtain an internal resistance of the motor $R_s$, and sending an identification result to the edge identification engine through a network;
   performing identification analysis, by the edge identification engine, the cloud identification result and the parameters of the servo motor to obtain identification results of d-q axes inductances of the motor and a flux linkage; wherein a neural network identification algorithm in the cloud identification engine is as follows:

$$R_s = f_k(\cdot) * G2 + f_{k-1}(\cdot) * G1$$

wherein G1 and G2 are weights of corresponding output functions, and G1+G2=1;

$f_k(\cdot)$ represents a network output value at a time k, $f_{k-1}(\cdot)$ represents a network output value at a time k−1, defined as follows:

$$f_k(\cdot)=i_q*w1+i_d*w2+u_q*w3+u_d*w4+T*w5+w*w6$$

wherein wi represents a weight of an input quantity, i=1, 2, ..., 6, and w1+w2+w3+w4+w5+w6=1, w is a motor speed, $i_d$ and $i_q$ are d-q axes currents, $u_d$ and $u_q$ are d-q axes input voltages, and T is a motor temperature;

the edge identification engine identifies the parameters $L_q$, $L_d$ and $\varphi_f$ by using the following equations:

$$A = \frac{\sum_{i=1}^{n} y_i \left(x_i - \frac{1}{n}\sum_{i=1}^{n} x_i\right)}{\sum_{i=1}^{n} x_i^2 - \frac{1}{m}\left(\sum_{i=1}^{m} x_i\right)^2},$$

$$B = \frac{1}{m}\sum_{i=1}^{n}(y_i - Ax_i),$$

wherein dimensions of $y_i$ and $x_i$ are m*n dimensions, $$y_i = \begin{pmatrix} i_d \\ i_q \end{pmatrix}, x_i = \begin{pmatrix} u_d \\ u_q \end{pmatrix}, A = \begin{bmatrix} R_s & -\omega L_q \\ \omega L_d & R_s \end{bmatrix}^{-1},$$

$$B = \begin{bmatrix} R_s & -\omega L_q \\ \omega L_d & R_s \end{bmatrix}^{-1} \begin{bmatrix} 0 \\ \omega \varphi_f \end{bmatrix},$$

$i_d$ and $i_q$ are the d-q axes currents, $u_d$ and $u_q$ are the d-q axes input voltages, T is the motor temperature, $R_s$ is the internal resistance of the motor, $\omega$ is an angular velocity of the motor, $L_d$ and $L_q$ are the d-q axes inductances, and $\varphi_f$ is the flux linkage.

2. The cloud and edge integrated method for identifying parameters of a servo motor according to claim 1, wherein in the data processing, a low-pass filter is used to process the motor temperature T:

$$H(s) = \frac{1}{\frac{s}{w_c}+1}, w_c = 2\pi * f_c,$$

wherein H(s) is a Laplace transform transfer function, s is a complex frequency domain, $w_c$ is a cutoff frequency, and $f_c$ is a frequency.

3. The cloud and edge integrated method for identifying parameters of a servo motor according to claim 1, wherein in the data processing, filtering is performed by using the following equations for data processing of the currents of the motor $i_{q/d}$:

a q/d-axis decoupling model of the motor is established:

$$\begin{cases} i_{q/d}(t+1) = Ci_{q/d}(t) + Du_{q/d}(t) + d(t) \\ z(t) = Hi_{q/d}(t) + v(t) \end{cases},$$

wherein $C=-R_s/L_{q/d}$, $D=1/L_{q/d}$, d(t) is a process noise, v(t) is a measurement noise, z(t) is a state observed quantity, H is a state transfer coefficient, $R_s$ is the internal resistance of the motor, and $L_{q/d}$ is the q/d-axis inductance;

let $$\vec{i}_{q/d}(t+1)=C\tilde{i}_{q/d}(t)+Du_{q/d}(t) \qquad (2)$$

wherein $\vec{i}_{q/d}(t+1)$ is a predicted value of the q/d-axis current, $\tilde{i}_{q/d}(t)$ is an optimal estimated value of the current, and $u_{q/d}(t)$ is an input value of the q/d-axis voltage;

in addition, let $$\tilde{i}_{q/d}(t+1)=\vec{i}_{q/d}(t+1)+K_k(z(t)-H\vec{i}_{q/d}(t+1)) \qquad (3)$$

wherein $K_k$ is a gain coefficient, defined as follows:

$$K_k=\vec{P}_k H^T(H\vec{P}_k H^T+R)^{-1} \qquad (4)$$

wherein $H^T$ is a matrix transpose of H, and R is a covariance of the measurement noise v(t); and $\vec{P}k$ is a covariance between a real value and a predicted value, defined as follows:

$$\vec{P}_k = E[\vec{e}_k * \vec{e}_k^T] = \frac{1}{n-1}\sum_{i=1}^{n} \vec{e}_{ki} * \vec{e}_{ki}^T,$$

wherein $\vec{e}_k$ is a prior state error, defined as: $\vec{e}_k=i_{q/d}(t)-\vec{i}_{q/d}(t)$; $\vec{e}_{ki}$ represents an i-th prior state error sample;

moreover, a covariance $P_k$ between the real value and the optimal estimated value is defined:

$$P_k = E[e_k * e_k^T] = \frac{1}{n-1}\sum_{i=1}^{n} e_{ki} * e_{ki}^T,$$

wherein $e_k$ is a posterior state error, defined as: $e_k=i_{q/d}(t)-\tilde{i}_{q/d}(t)$; and $e_{ki}$ represents an i-th posterior state error sample;

moreover, a covariance $P_k$ between the real value and the optimal estimated value is defined:

and update laws are as follows:

$$P_k=(I-K_kH)\vec{P}_k \qquad (5)$$

$$\vec{P}_{k+1}=CP_kC^T+Q \qquad (6)$$

wherein I is an identity matrix, and Q is a covariance of the process noise d(t).

4. A cloud and edge integrated system for identifying parameters of a servo motor, comprising:

a servo motor parameter acquisition unit used for acquiring parameter data of the servo motor;

a sending unit used for receiving the parameter data of the servo motor and sending it to a cloud identification engine and an edge identification engine so as to enable the cloud identification engine and the edge identification engine to identify the parameters of the servo motor respectively;

the cloud identification engine used for identifying the parameter data of the servo motor and sending an identification result to the edge identification engine;

the edge terminal identification engine used for performing identification analysis of the acquired parameter data of the servo motor and the cloud identification result to obtain target parameter results; the cloud identification engine comprises a data processing module, a neural network identification module and an output module;

wherein, the data processing module is used for processing and denoising the acquired parameter data of the servo motor;

the neural network identification module is used for identifying the acquired parameter data of the servo motor to obtain Rs;

the output module is used for transmitting the identification result to the edge identification engine;

the neural network identification module identifies the internal resistance of the motor Rs based on the following neural network identification algorithm:

$$R_s = f_k(\cdot)*G2 + f_{k-1}(\cdot)*G1$$

wherein G1 and G2 are weights of corresponding output functions, and G1+G2=1;

$f_k(\cdot)$ represents a network output value at a time k, $f_{k-1}(\cdot)$ represents a network output value at a time k−1, defined as follows:

$$f_k(\cdot) = i_q*w1 + i_d*w2 + u_q*w3 + u_d*w4 + T*w5 + w*w6$$

wherein wi represents a weight of an input quantity, i=1, 2, ..., 6, and w1+w2+w3+w4+w5+w6=1, w is a motor speed, $i_d$ and $i_q$ are d-q axes currents, $u_d$ and $u_q$ are d-q axes input voltages, and T is a motor temperature;

the edge identification engine identifies the parameters $L_q$, $L_d$ and $\varphi_f$ by using the following equations:

$$A = \frac{\sum_{i=1}^{n} y_i \left(x_i - \frac{1}{n}\sum_{i=1}^{n} x_i\right)}{\sum_{i=1}^{n} x_i^2 - \frac{1}{m}\left(\sum_{i=1}^{m} x_i\right)^2},$$

$$B = \frac{1}{m}\sum_{i=1}^{n}(y_i - Ax_i),$$

wherein dimensions of $y_i$ and $x_i$ are m*n dimensions, $$y_i = \begin{pmatrix} i_d \\ i_q \end{pmatrix}, x_i = \begin{pmatrix} u_d \\ u_q \end{pmatrix}, A = \begin{bmatrix} R_s & -\omega L_q \\ \omega L_d & R_s \end{bmatrix}^{-1},$$

$$B = \begin{bmatrix} R_s & -\omega L_q \\ \omega L_d & R_s \end{bmatrix}^{-1} \begin{bmatrix} 0 \\ \omega \varphi_f \end{bmatrix},$$

$i_d$ and $i_q$ are the d-q axes currents, $u_d$ and $u_q$ are the d-q axes input voltages, T is the motor temperature, $R_s$ is the internal resistance of the motor, ω is an angular velocity of the motor, $L_d$ and $L_q$ are the d-q axes inductances, and $\varphi_f$ is the flux linkage.

5. The cloud and edge integrated system for identifying parameters of a servo motor according to claim 4, wherein the data processing module processes the motor temperature T according to the following low-pass filter:

$$H(s) = \frac{1}{\frac{s}{w_c} + 1}, w_c = 2\pi * f_c,$$

wherein H(s) is a Laplace transform transfer function, s is a complex frequency domain, $w_c$ is a cutoff frequency, and $f_c$ is a frequency.

6. The cloud and edge integrated system for identifying parameters of a servo motor according to claim 4, wherein in the data processing module, filtering is performed by using the equations (2)-(6) in claim 3 for data processing of the currents of the motor $i_{q/d}$.

* * * * *